Patented Sept. 29, 1925.

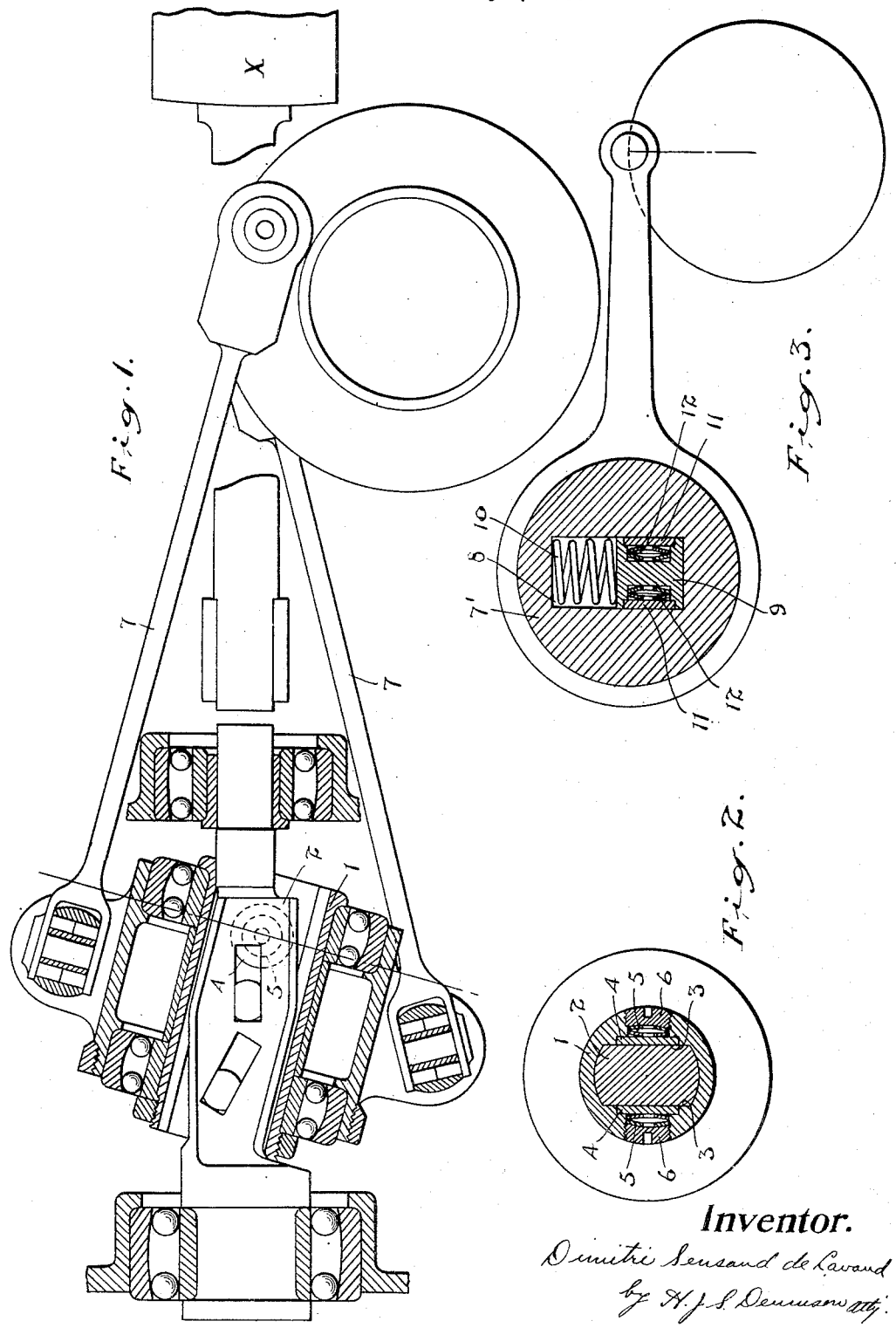

1,555,641

UNITED STATES PATENT OFFICE.

DIMITRI SENSAUD DE LAVAUD, OF PARIS, FRANCE.

VARIABLE-SPEED TRANSMISSION.

Application filed July 7, 1924. Serial No. 724,608.

*To all whom it may concern:*

Be it known that I, DIMITRI SENSAUD DE LAVAUD, a citizen of the United States of Brazil, and resident of the city of Paris, in the Republic of France, have invented certain new and useful Improvements in Variable-Speed Transmission, as described in the following specification, and illustrated in the accompanying drawings, that form part of the same.

The principal object of this invention is to effectively eliminate the unabsorbed vibratory movement and the consequent noise in a transmission in which an oscillatable member is rotatably connected with the drive shaft and operates a plurality of reciprocable members to impart motion to the driven shaft, as for example, a structure such as disclosed in my co-pending application No. 687,672.

The principal feature of the invention consists in braking the periodic oscillations not absorbed by the driven shaft which are produced by oscillations which are synchronous with the sinusoidal variation of the movement of the member operating the driven shaft, such braking eliminating the periodicity and effecting the balancing of the system.

In the drawings, Figure 1 is a part longitudinal sectional elevational view of a transmission to which the present invention is applied.

Figure 2 is a transverse section through the oscillating sleeve and driving shaft.

Figure 3 is a sectional diagrammatic view illustrating a modification of the application of the invention.

In the application of the invention as illustrated in Figures 1 and 2 the oscillatable sleeve 1 encircling the cranked end 2 of the shaft is formed with the flattened side walls 3 engaging the flat sides of the shaft and in this sleeve are arranged a pair of discs 4 intermediate of the width of the side walls, said discs bearing against the flat sides 3 of the crank, being held in resilient pressure contact therewith by suitable springs, here shown as reverse Belleville discs 5, the pressure of which are regulated by the adjusting screws 6.

The pressure of the discs 5 against the side walls of the shaft is calculated according to the maximum reaction of the rods 7 following the power stroke, which reaction is associated with the reactionary movement of the balancing spring medium X which opposes the thrust of the oscillatable member. This braking of the rods prevents a further reactionary movement and consequent vibration.

In the form of the device illustrated in Figure 3 the invention is shown applied to an eccentric drive. The sheave 7' is formed with an elongated rectangular orifice 8 in which the squared shaft 9 is slidably fitted.

A coil spring 10 tends to hold the shaft to one end of the orifice 8 but the rotation of the eccentric tends to throw the shaft 9 outwardly, thereby compressing the spring 10.

Within the shaft 9 are arranged the discs 11 placed in oppositely arranged recesses and the discs are held outwardly in contact with the face of the orifice 8 of the sheave by the spring discs 12.

This braking action is symmetrical and perpendicular to the line of action of the compensating spring 10, consequently vibrations generated in any portion of the drive will be counteracted.

What I claim as my invention is:—

1. In a power transmission device, the combination with a rotative element translating the rotative action into alternating movements of variable length and means for rotating said element having a changeable relation with said rotating element, of means for effecting a braking action between the aforesaid elements independent of the rotative speed thereof.

2. In a power transmission device, the combination with a rotative element translating the rotative action into alternating movements of variable length, means for rotating said element having a changeable relation with said rotating element and a balancing spring member arranged between said rotating means and said rotatable element, of braking members arranged in one of the aforesaid elements and frictionally engaging the other of said elements and adapted to retard the relative movement of said elements, and spring means for pressing said braking members into braking contact with the engaging member.

3. In a variable speed transmission, the combination with a drive shaft and oscillatable member rotatable therewith and means for translating the oscillations of said member into rotary movement, of braking means operative with the oscillations of said oscillating member to eliminate periodicity in the connections of the oscillating member.

4. In a variable speed transmission, the combination with the drive shaft and an oscillating member mounted to oscillate longitudinally thereof and operating to effect the translation of the movement of the drive shaft to rotate a cross shaft, of pressure braking means arranged between the drive shaft and the oscillating member.

5. In a variable speed transmission, the combination with the drive shaft having flattened faces and an oscillating member having a recess formed with parallel sides engaging the flattened faces of the shaft, said oscillating member actuating the longitudinally movable members to translate the rotary movement of the shaft, of recesses arranged in the side walls of the oscillating member, discs housed in said recesses and engaging the flat faces of the shaft, and springs exerting a pressure against said discs to hold them in pressure contact with the shaft.

DIMITRI SENSAUD de LAVAUD.